United States Patent
Avanzi

(10) Patent No.: US 9,712,319 B2
(45) Date of Patent: *Jul. 18, 2017

(54) METHOD AND APPARATUS TO ENCRYPT PLAINTEXT DATA

(71) Applicant: QUALCOMM Incorporated, San Diego, CA (US)

(72) Inventor: Roberto Avanzi, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,684

(22) Filed: Feb. 2, 2016

(65) Prior Publication Data

US 2016/0156461 A1 Jun. 2, 2016

Related U.S. Application Data

(63) Continuation of application No. 13/929,589, filed on Jun. 27, 2013, now Pat. No. 9,294,266.

(51) Int. Cl.
*H04L 29/06* (2006.01)
*H04L 9/06* (2006.01)

(52) U.S. Cl.
CPC ........ *H04L 9/0618* (2013.01); *H04L 2209/08* (2013.01); *H04L 2209/34* (2013.01)

(58) Field of Classification Search
CPC ..... G06F 12/1408; H04L 9/06; H04L 9/0618; H04L 9/0668
USPC ........................................................ 713/189
See application file for complete search history.

(56) References Cited

U.S. PATENT DOCUMENTS

| | | | |
|---|---|---|---|
| 5,511,123 A | 4/1996 | Adams | |
| 6,769,063 B1 * | 7/2004 | Kanda | H04L 9/002 380/29 |
| 6,920,562 B1 * | 7/2005 | Kerr | G06F 9/30003 380/28 |
| 7,797,751 B1 | 9/2010 | Hughes et al. | |
| 8,767,957 B1 * | 7/2014 | Bagchi | H04L 63/0428 380/28 |
| 2001/0024501 A1 | 9/2001 | Furukawa | |
| 2002/0166053 A1 | 11/2002 | Wilson | |

(Continued)

OTHER PUBLICATIONS

Kakarountas, A. P., and H. Michail. "Implementation of a cryptographic co-processor." Proceedings of the 6th WSEAS international conference on Information security and privacy. World Scientific and Engineering Academy and Society (WSEAS), 2007.*

(Continued)

*Primary Examiner* — Syed Zaidi
(74) *Attorney, Agent, or Firm* — Won Tae C. Kim

(57) ABSTRACT

Disclosed is an apparatus and method for encrypting plaintext data. The method includes: receiving at least one plaintext data input; applying a Nonce through a function to the at least one plaintext data input to create Nonced plaintext data outputs and/or to intermediate values of a portion of an encryption function applied to the at least one plaintext data input to create intermediate Nonced data outputs; and applying the encryption function to at least one of the Nonced plaintext data outputs and/or the intermediate Nonced data outputs to create encrypted output data. The encrypted output data is then transmitted to memory.

24 Claims, 8 Drawing Sheets

(56) References Cited

U.S. PATENT DOCUMENTS

| | | |
|---|---|---|
| 2005/0114688 A1 | 5/2005 | Leis et al. |
| 2005/0157871 A1 | 7/2005 | Komano et al. |
| 2006/0056623 A1 | 3/2006 | Gligor et al. |
| 2010/0031057 A1 | 2/2010 | Beaver et al. |
| 2010/0183146 A1 | 7/2010 | Leech |
| 2010/0229005 A1 | 9/2010 | Herman et al. |
| 2011/0055585 A1* | 3/2011 | Lee ............... H04L 9/0844 713/183 |
| 2011/0191588 A1 | 8/2011 | Rogaway |
| 2013/0004027 A1 | 1/2013 | Griffin |
| 2013/0077780 A1 | 3/2013 | Rogaway |
| 2015/0006905 A1 | 1/2015 | Avanzi |

OTHER PUBLICATIONS

"Draft Standard Architecture for Encrypted Shared Storage Media," IEEE Computer Society, IEEE P1619/D18, Oct. 2007, www.grouper.ieee.org.
"Draft Standard Architecture for Encrypted Shared Storage Media," IEEE Computer Society, IEEE P1619D5, Mar. 23, 2006, 27 Pages, www.grouper.ieee.org.
"IEEE Standard for Cryptographic Protection of Data on Block-Oriented Storage Devices," IEEE Computer Society, IEEE Std 1619TM-2007, Apr. 18, 2008, 42 Pages, www.ieeexplore.ieee.org.
International Search Report and Written Opinion—PCT/US2014/043169—ISA/EPO—Mar. 17, 2015.
Niels P., "Encrypting Virtual Memory", 9th USENIX Security Symposium, 2000, pp. 35-44.

\* cited by examiner

METHOD AND APPARATUS TO ENCRYPT PLAINTEXT DATA

CROSS-REFERENCE TO RELATED APPLICATIONS

This application is continuation application of, and claims the benefit of priority to, U.S. patent application Ser. No. 13/929,589, filed on Jun. 27, 2013, the entire contents of which are incorporated herein by reference.

BACKGROUND

Field

The present invention relates to a method and apparatus to encrypt plaintext data and decrypt the corresponding ciphertext data.

Relevant Background

The use of memory analyzers represents a large threat to the integrity and confidentiality of distributing content. Even if great care is devoted to protect data contained in code, the contents of memory may be captured by bus sniffing. For example, this can be used to leak raw content, even if it is distributed in an encrypted form, after it has been decrypted in a secure environment for rendering. This may be accomplished by "reading" the electric signals corresponding to the writes to the memory. Other more sophisticated attacks may even replay these signals to trick the processor into reading and processing data chosen by an attacker.

Content providers often have particular requirements for the handling of raw content. At a bare minimum, the content can never be stored in memory in the clear. In most cases, there is at least a requirement that some form of memory scrambling or encryption be applied to all memory recording to prevent physical attacks. As an example, the data written to a specific address is usually a function of the clear data, the address, and a master key. This guarantees that the same data, when written to different addresses, has a different encoding. The use of nonces to randomize the encryption of the plaintext data, when these nonces are stored and retrieved in a secure way, can be used to prevent replay attacks.

Moreover, throughput requirements for secure communication are putting current stream and block ciphers to test, and novel constructions to increase throughput while at the same time controlling power and area requirements are desirable.

Unfortunately, the current techniques are often inefficient, and a stronger level of protection, a higher throughput at the same security level and without significant increases in power and, in the case of hardware implementations, area requirements, may be desired.

SUMMARY

Aspects of the invention may relate to an apparatus and method for encrypting plaintext data. The method and apparatus may include: receiving at least one plaintext data input; applying a Nonce through a function to the at least one plaintext data input to create Nonced data outputs; applying an encryption function by encrypting the at least one plaintext data input by a first sequence of round functions modeling the encryption function before the Nonce is applied, and thereafter, the Nonce is applied to create the Nonced data outputs, and the Nonced data outputs are encrypted by a second sequence of round functions modeling the encryption function to create encrypted output data; and transmitting the encrypted output data to memory.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Embodiments of the invention relate to techniques to provide an enhanced mechanism for the protection of data stored in memory. In particular, methods and processes are described that extend the functionality of block ciphers in order to enhance memory encryption. Additionally, these techniques may also improve performance, throughput, and power consumption, as will be hereinafter described. These techniques may also be used to improve performance, throughput, and power consumption for the purpose of secure data storage of transmission over (wired or wireless) networks.

In one embodiment, an encryption scheme is utilized in which a series of L blocks of plaintext data inputs are encrypted using an encryption function (e.g., a block cipher). Prior to encryption with the block cipher, a Nonce is applied through a function to the plaintext data inputs. In particular, a method or process to encrypt plaintext data is disclosed that includes: receiving a plurality of plaintext data inputs; applying a Nonce through a function to the plurality of plaintext data inputs to create Nonced plaintext data outputs; applying an encryption function such as a block cipher to the Nonced plaintext data outputs to create encrypted output data; and transmitting the encrypted output data to memory.

In one embodiment, as will be more particularly described hereinafter, the method may include: receiving a plurality of plaintext data inputs; applying a Nonce through a function to the plurality of plaintext data inputs to create plaintext data outputs and/or to intermediate values of a portion of an encryption function applied to the plurality of plaintext data inputs to create intermediate Nonced data outputs; and applying the encryption function to at least one of the Nonced plaintext data outputs and/or the intermediate Nonced data outputs to create encrypted output data. The encrypted output data is then transmitted to memory.

Randomizing the Encryption of L Blocks of Plaintext Data Inputs

Figure 1A:
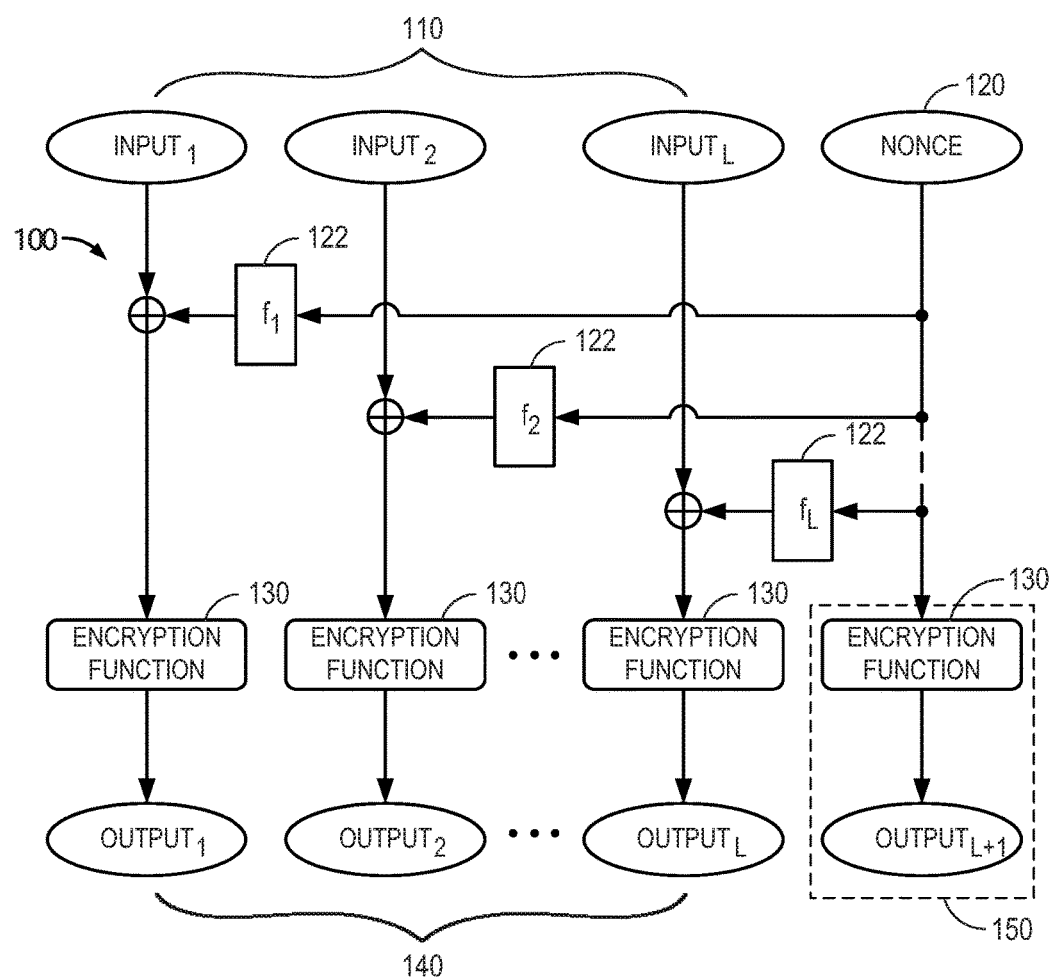
FIG. 1A is a flow diagram illustrating a process in which a series of blocks of plaintext data inputs are encrypted using an encryption function and a Nonce.

As can be seen in FIG. 1A, in one embodiment, a method or process 100 is performed in which a plurality of plaintext data inputs (Input1-InputL) 110 are received. A Nonce 120 is applied through a function 122 to the plaintext data inputs (Input1-InputL) 110. The Nonce 120 may be used to randomize the encryption of the L blocks of plaintext data (Input1-InputL) 110. As can be seen in FIG. 1A, L blocks of plaintext data (Input1-InputL) 110 are received and a Nonce 120 may be applied by functions (f1, f2, . . . , fL) 122 to create Nonced plaintext data outputs. In one embodiment, as will be described in more detail hereinafter, the function to apply the Nonce 120 may include an XOR function. In another embodiment, instead of an XOR function, a modular addition function may be used. An encryption function 130 (e.g., a block cipher) may then be applied to the Nonced plaintext data outputs such that encrypted output data (Output1-OutputL) 140 is outputted to memory.

It should be appreciated that the Nonce 120 may be subject to some transformations in order to avoid that equal blocks of plaintext (among the L blocks 110 processed at the same time) have the same encryption. Also, because the cryptographic key used in the encryption function 130 used in the L parallel encryptions may be the same, the key schedule does not need to be redone L times Further, Nonce 120 may either be stored in a smaller, internal, protected area of memory, or stored in the main memory, either in a clear or encrypted manner, depending on use cases, as will be described in more detail hereinafter.

Also, for simplicity, particular encryption keys used in the encryption functions 130 are not represented. However, it should be appreciated that the encryption functions take an additional input, which is the key used by the encryption function in the encryption process. Moreover, it should also be appreciated that, in the case the encryption functions are iterated block ciphers using the same encryption key, the various vertical pipelines may share the same key schedule, where some fixed bit permutations (such as rotations) may be applied to the rounds before being used in the encryption functions 130. In a hardware implementation, these permutations should have no performance impact, because they amount to just a different wiring in the silicon.

The functions (f1, f2, . . . , fL) 122 may be mathematical functions that derive values from the Nonce 120 in order to perturbate the computation of the Nonced plaintext data outputs in a manner unpredictable for an attacker. These can be maskings with constants, different circular rotations, or other functions that may be related to the chosen encryption function 130. If the Nonce 120 has larger size than the cipher block length, then the functions may just be extractions of segments of the Nonce.

Further, methodology 100 may be parallelizable, utilizing L or L+1 implementations of the same encryption function 130 (or a different encryption function may be utilized). As can be seen in FIG. 1A, in dashed lines 150, an expansion of the ciphertext is shown as an L+1-th implementation, which outputs one additional block. Also, because the same encryption key for the encryption function 130 may be used for each block, sub-key derivation needs to be performed only once, thus saving hardware resources.

In some embodiments, sufficient security may be provided by storing the Nonce 120 in the clear in an accessible memory area, as it plays a role similar to that of an initialization vector. A benefit of this approach is that the Nonce 120 can be shorter than the block size, and therefore it may be applied in the function operations 122 only to selected bit fields of the input blocks 110. This scheme may be useful for memory encryption. As an example, if the block cipher has a block size of 128 bits and cache lines are 128 bytes long, by setting L=8, whole cache lines can be encrypted at once when they are spilled from the last level of the cache.

Thus, as previously described, process 100 extends the functionality of block ciphers in order to enhance memory encryption. In particular, encryption scheme 100 utilizes a series of L blocks of plaintext data inputs (Input1-InputL) 110 that are each encrypted using encryption function 130, in which prior to encryption with encryption function 130, a Nonce 120 is applied through a function 122 to the plaintext data inputs 100. The encryption function 130 may be applied to the Nonced plaintext data outputs such that encrypted output data (Output1-OutputL) 140 is outputted to memory.

Figure 1B:
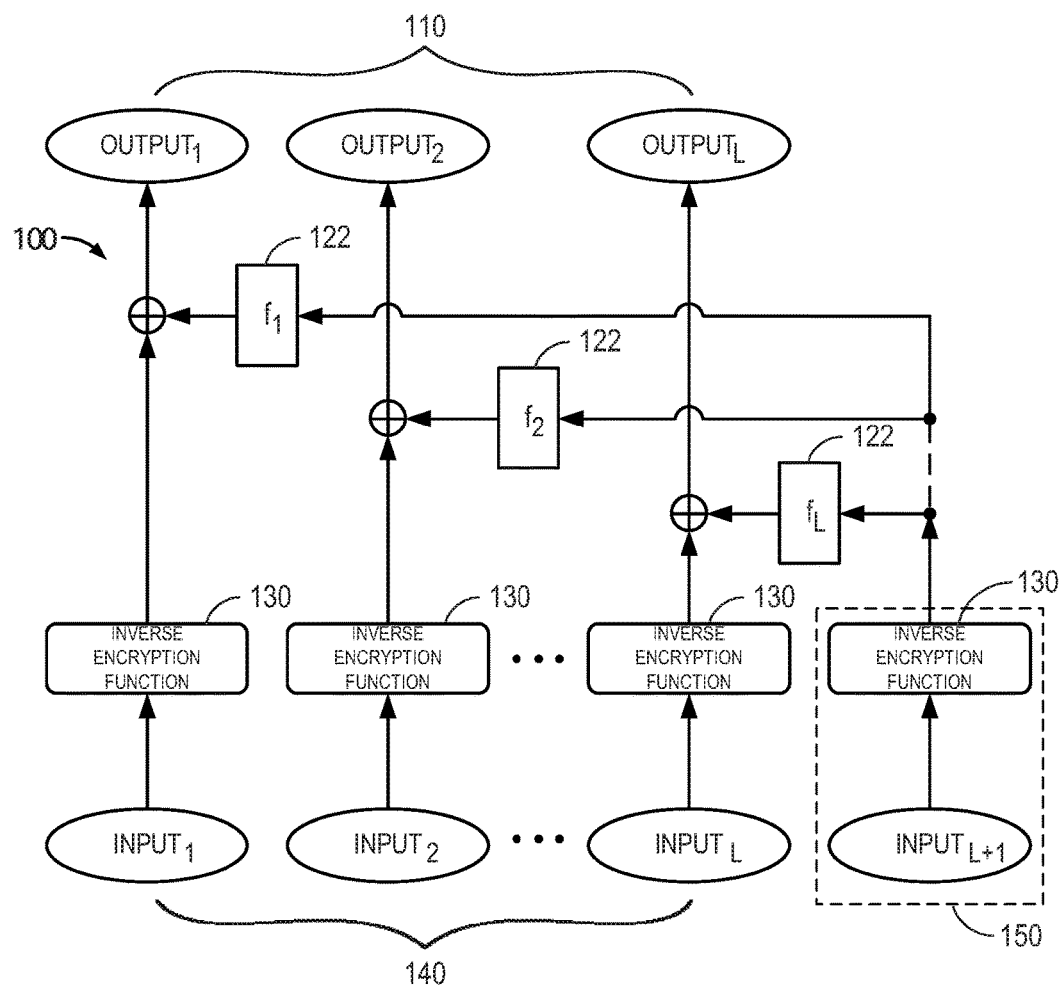
FIG. 1B is a flow diagram illustrating the reverse decryption process of FIG. 1A.

Decryption works backwards. For example, with reference to FIG. 1B, the inverse function of encryption function 130 can be applied to the encrypted output data from memory (shown as Input 140), that is the corresponding decryption primitive, may be used to compute the composition of $Input_i$ and Nonce, for instance $Input_i \oplus Nonce$, for i=1, 2, . . . , L and Nonce, from which the original Inputs are recoverable (shown as Outputs 110).

Randomizing the Block Cipher

As will be described hereinafter, the plaintext data inputs 110 may first be encrypted by a first sequence of round functions that constitute the block cipher (which is the chosen encryption function), before the Nonce 120 is applied, and thereafter, the Nonce is applied, to create Nonced data outputs. The Nonced data outputs may then be encrypted by a second sequence of round functions modeling the block cipher (which is the chosen encryption function) to create the encrypted output data that is outputted to memory.

In order to model the encryption function 130 (e.g., block cipher) various constructions may be used. For example, constructions such as Luby-Rackoff constructions may be used, e.g., Feistel networks (such as Data Encryption Standard (DES)), and Substitution-Permutation (SP) networks (such as Advanced Encryption Standard (AES)). In both cases, one parameterized non-linear function is repeatedly applied to the input. Each application of this function may be referred to as a "round" or "round function". The output of a round is the input of the next round. The plaintext is the input to the first round, and the ciphertext is the output of the last round. The round function takes a further parameter called the round key and the round keys are derived from the encryption/decryption key (e.g., the cipher key).

Figure 2:
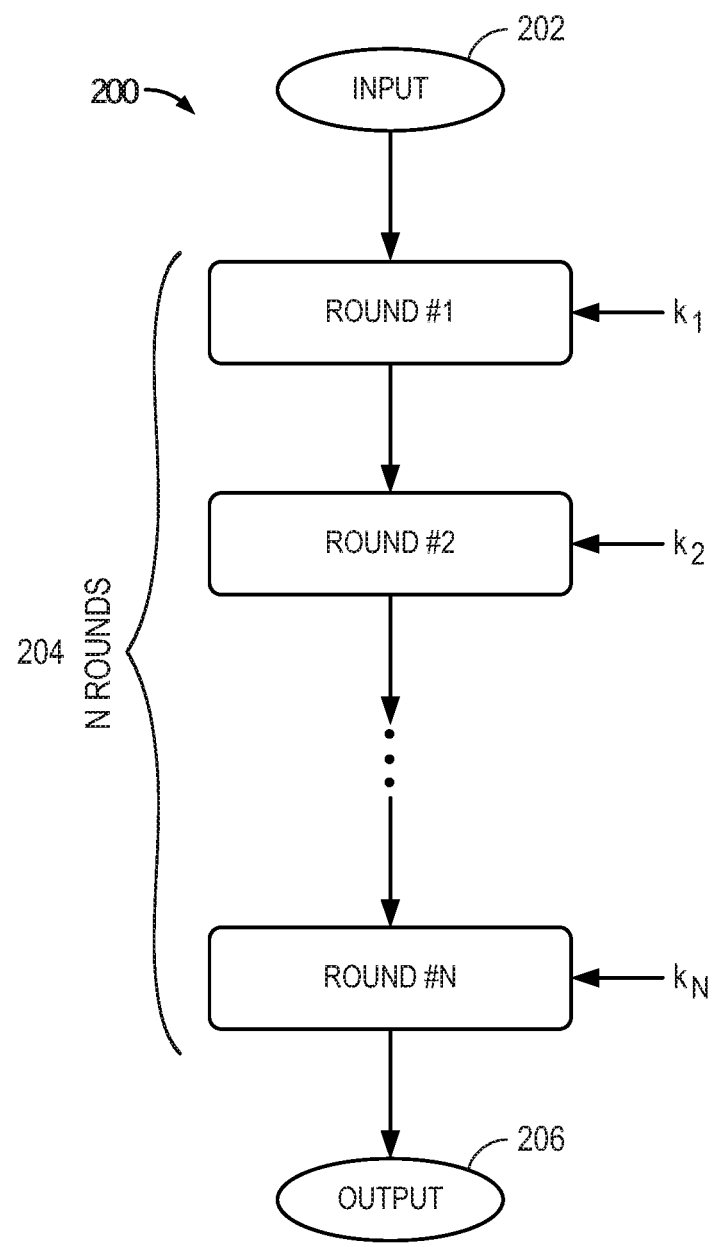
FIG. 2 is a flow diagram illustrating a common structure of a block cipher based on the iterations of similar computational blocks referred to as rounds.

With reference to FIG. 2, an example of a process 200 to generate a block cipher based upon round functions is illustrated. As shown in FIG. 2, a plaintext data input 202 is inputted to a plurality of N rounds 204 of the round function, modeling the block cipher. Therefore, the block cipher is modeled by the plurality of N rounds 204 of round functions, where k1, k2, . . . kN are the round keys for Rounds 1, 2, . . . , N respectively. Output 206 is the encrypted plaintext data input 202 encrypted by the round function (modeling the block cipher) applied to the plaintext data input 202. It should be appreciated that decryption would be the exact same process in reverse.

An example implementation will be hereinafter described. For example, a performance efficient implementation of this scheme may require two parallel implementations of the same block cipher, possibly sharing the round keys. In order to reduce hardware implementation costs, the Nonce may be applied in the middle of the cipher. By means of this, the part of the cipher before the application of the Nonce must be implemented only once, and the part of the cipher following the application of the Nonce is implemented twice.

Figure 3:
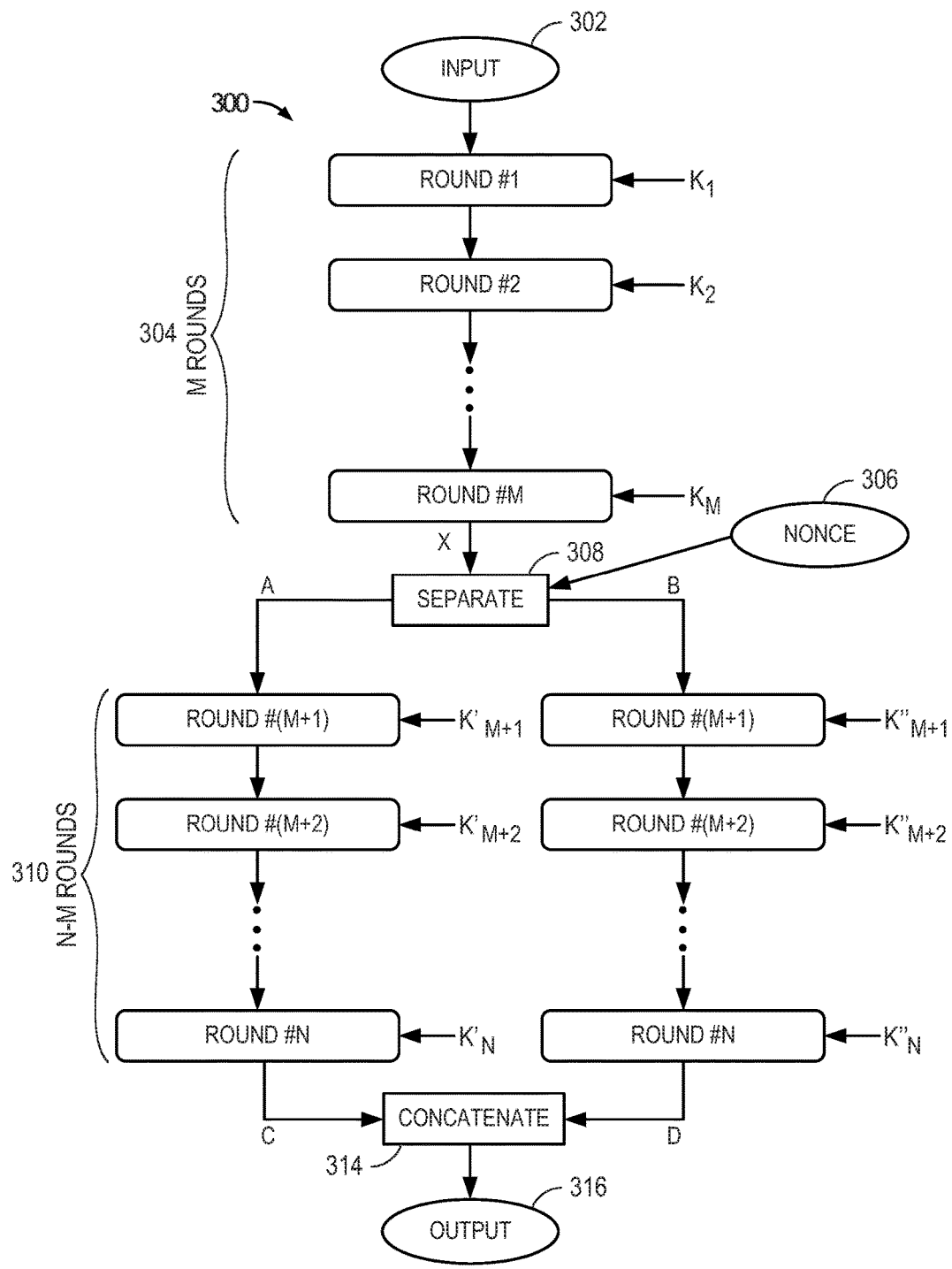
FIG. 3 is a flow diagram illustrating a process to encrypt a data input in expanded form using a first and second set of round functions and augmenting an intermediate step of the encryption process with a Nonce.

As an example, with reference to FIG. 3 which illustrates a process 300, the plaintext data input 302 may be encrypted through M of the N rounds ($1 \leq M < N$), e.g., M rounds 304 parametrised using M round keys (k1, k2, ... kM). Next, the Nonce (v) 306 is applied—for instance XORing it to the output X of the M-th round—and the XORed output and the Nonce are encrypted further, independently (separate block 308)—and resuming the process with the (M+1)-th round. As can be seen in FIG. 3, the next round of round keys k' and k" for N-M rounds 310 may be the same set of round keys or may be slight variants of each other, such as different rotations or masked with different secret constants. Additionally, the outputs may be concatenated (block 314) resulting in Output 316.

Another example of a slightly different implementation may consist of a permutation of the bits of X and of the Nonce. For example, if X were set to $X_{hi}\|X_{lo}$ (decomposition as concatenation of two bit strings of equal length) and v (Nonce) was set to $v=v_{hi}\|v_{lo}$ then A would be $A=X_{hi}\|v_{lo}$ and B would be $B=X_{lo}\|v_{hi}$. Therefore, if the last N-M rounds have sufficient diffusion, then there is enough influence of both X and Nonce on both halves C and D of the Output. It should be appreciated that this is just an example, other bit permutations are possible. However, if the block size is large enough the scheme may not lead to frequent (partial) repetitions of the same ciphertexts for the same plaintext. Therefore, it may be advisable to have the Nonce influence the whole of the next input, such as an equation like, $A=(X_{hi}\oplus v_{hi})\|v_{lo}$ and $B=(X_{lo}\oplus v_{lo})\|v_{hi}$. It should be appreciated that significance here is that the process be easily reversible—such that the Nonce can be recovered once the decryption process has performed N-M rounds. Further, the concatenate function 314 can be the concatenation of the two outputs of the last parallel rounds—but any another bit permutation of the two inputs can be used here. The process is beneficial in that hardware implementations of the first M rounds do not have to be duplicated—but only for the last N-M rounds. Decryption works also in this case backwards. The two "sides" C and D of Output are decrypted in parallel for the last N-M rounds, until Nonce v is recovered, the separate operation is reversed, and then the decryption of the Input is completed in M rounds.

Figure 4A:
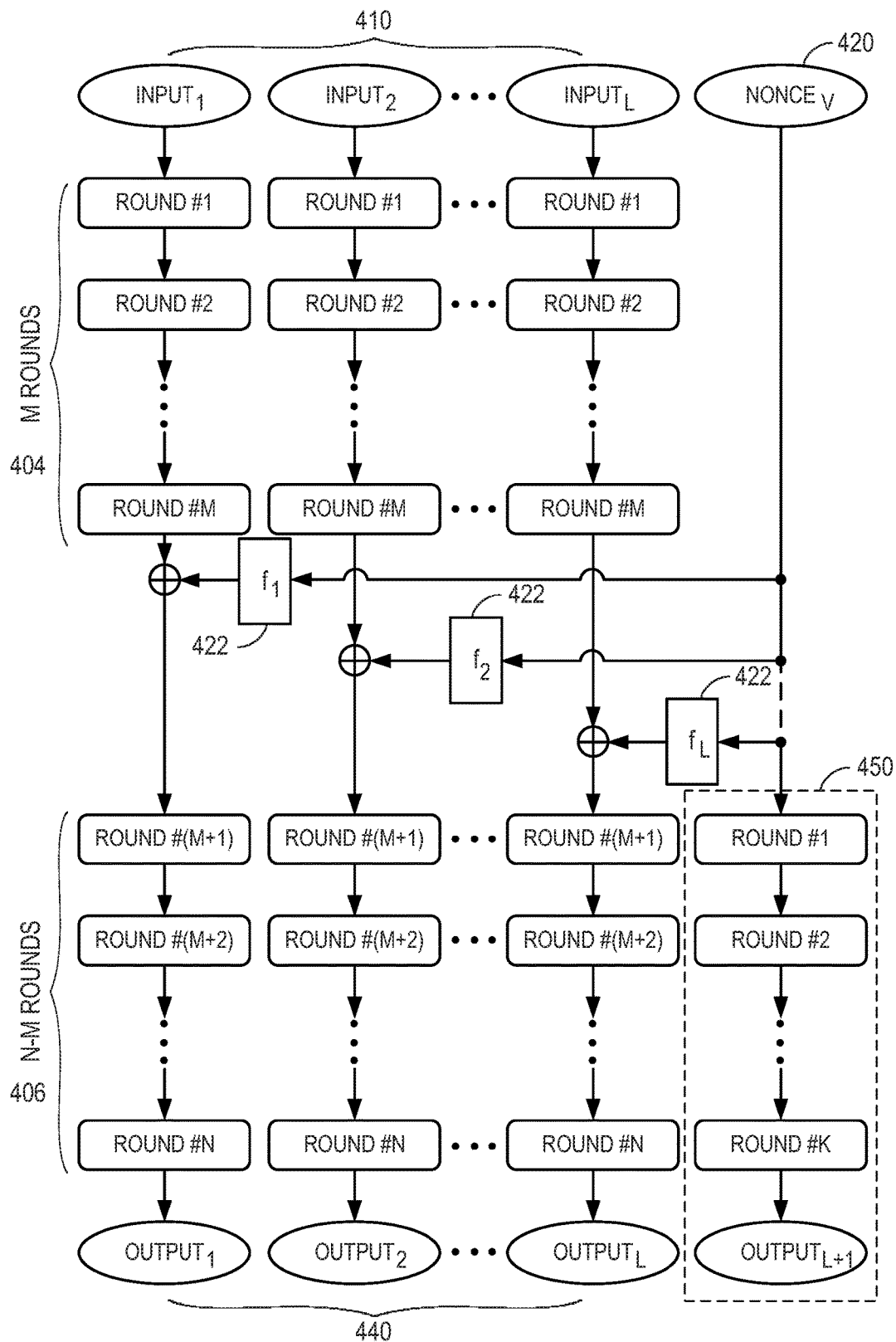
FIG. 4A is a flow diagram illustrating a process to encrypt a series of blocks of plaintext data inputs using the same key and a Nonce or values derived from a Nonce to modify in different ways the encryption processes of the individual blocks.

With reference to FIG. 4A, an example of a process 400 is illustrated, generalizing the previous techniques, to simultaneously encrypt L blocks of plaintext data inputs (Input1-InputL) 410, in which a Nonce 420 is added to each block, after being suitably transformed, along with the use of various rounds. In particular, the process 400 of FIG. 4A, illustrates that the plaintext data inputs 410 may be encrypted by a first sequence of round functions (M rounds 404) before the Nonce 120 is applied, and thereafter, the Nonce 420 is applied, to create Nonced data outputs. As can be seen in FIG. 4A, the L blocks of plaintext data (Input1-InputL) 410 are received and functions (f1, f2, . . . , fL) 422 are applied to a Nonce 420 to create differently Nonced data outputs. In one embodiment, the function to apply the Nonce 420 may include a XOR function. Alternatively, other easily invertible functions, such as modular additions or subtractions may be used to apply the (values derived from the) Nonce. The Nonced data outputs may then be encrypted by a second sequence (N-M rounds 406) of round functions to create the encrypted output data 440 that is outputted to memory. It should be appreciated that by utilizing the M and N-M rounds 404 and 406 that the full encryption function is thereby modeled and applied. Further, methodology 400 may be parallelizable, utilizing L (in the case the nonce is not encrypted) or L+1 (in the case the nonce is encrypted) implementations of the round functions 404 and 406 to create the encrypted output data that is outputted to memory.

It should be appreciated that function (f1, f2, . . . , fL) 422 perform substantially the same roles as described with reference to FIG. 1A. However, the fact that the functions are not implemented until the (M+1)-th round 406 of the underlying block cipher allows a more complex derivation from the Nonce. In the case of AES implementation, some alteration of the AES key scheduling procedure could be adopted to generate the functions. In one embodiment, the functions could be computed in parallel with the first M rounds 404 of the block cipher. It may be beneficial to not feed all the same round keys to the various rounds, but to also apply some fixed permutations and/or maskings to them, which are unique for each vertical pipeline. Also, it may be beneficial, depending on use case requirements, to just store the Nonce 420 in the clear in an accessible or in a protected memory area, as it may play a role similar to that of an initialization vector, and may still be secure enough.

Figure 4B:
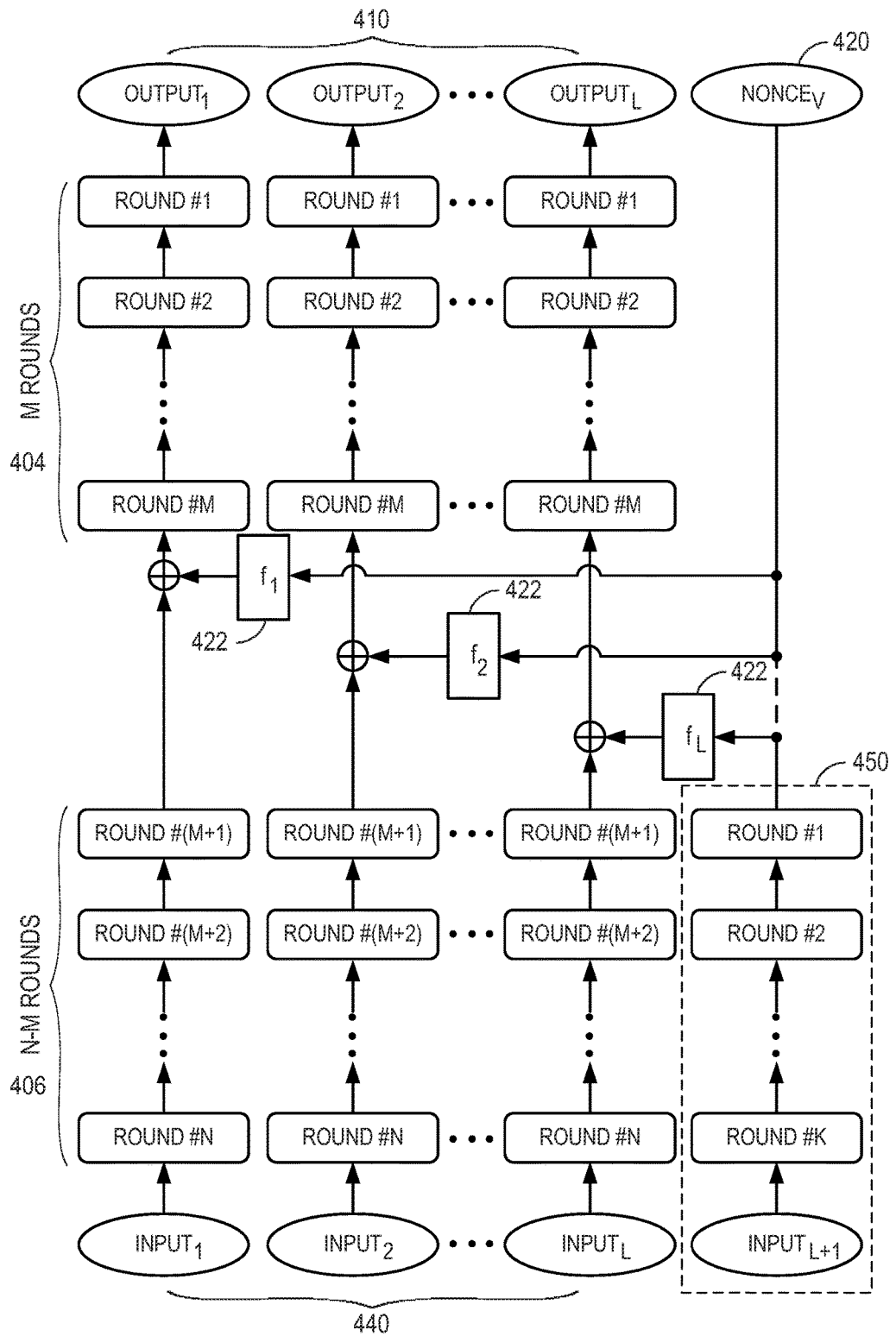
FIG. 4B is a flow diagram illustrating the reverse decryption process of FIG. 4A.

Decryption works backwards. For example, with reference to FIG. 4B, inputs 440 are the outputs of the encryption of FIG. 4A and the outputs 410 should correspond to the original inputs (i.e., the original plaintext inputs).

Resource Savings

It should be appreciated that all of the previous schemes have been based on the idea that the plaintext is encrypted directly by the encryption function. However, several modes of operations for block ciphers use the encryption primitive to generate a key stream that is XORed to the plaintext to derive the ciphertext—for instance Counter (CTR) mode. Examples of this type of encryption will be hereinafter described. When attempting to save resources for key stream generation, it needs to be ensured that too much saving does not occur at the expense of security—i.e., the various key stream blocks must appear uncorrelated to each other. For instance, it may be tempting to reuse a block from the "key stream" to encrypt several input blocks—in a memory encryption scenario this could easily solve the problem of the area of the memory encryption circuits. However, if two blocks of plaintext P1 and P2, are both XORed, with the same pad $\pi$, the ciphertext blocks would be $C1=P1\oplus\pi$ and $C2=P2\oplus\pi$, which satisfy $P1\oplus P2=C1\oplus C2$. This can reveal significant information about the plaintext, and is thus unsuitable to store critical information. However, it may be beneficial to use common hardware to compute only the first rounds of two or more blocks of the key stream, and then perform the last rounds separately. The security of such a method depends on the cryptanalysis of reduced round versions of the used cipher and the predictability of intermediate values after some rounds.

Figure 5:
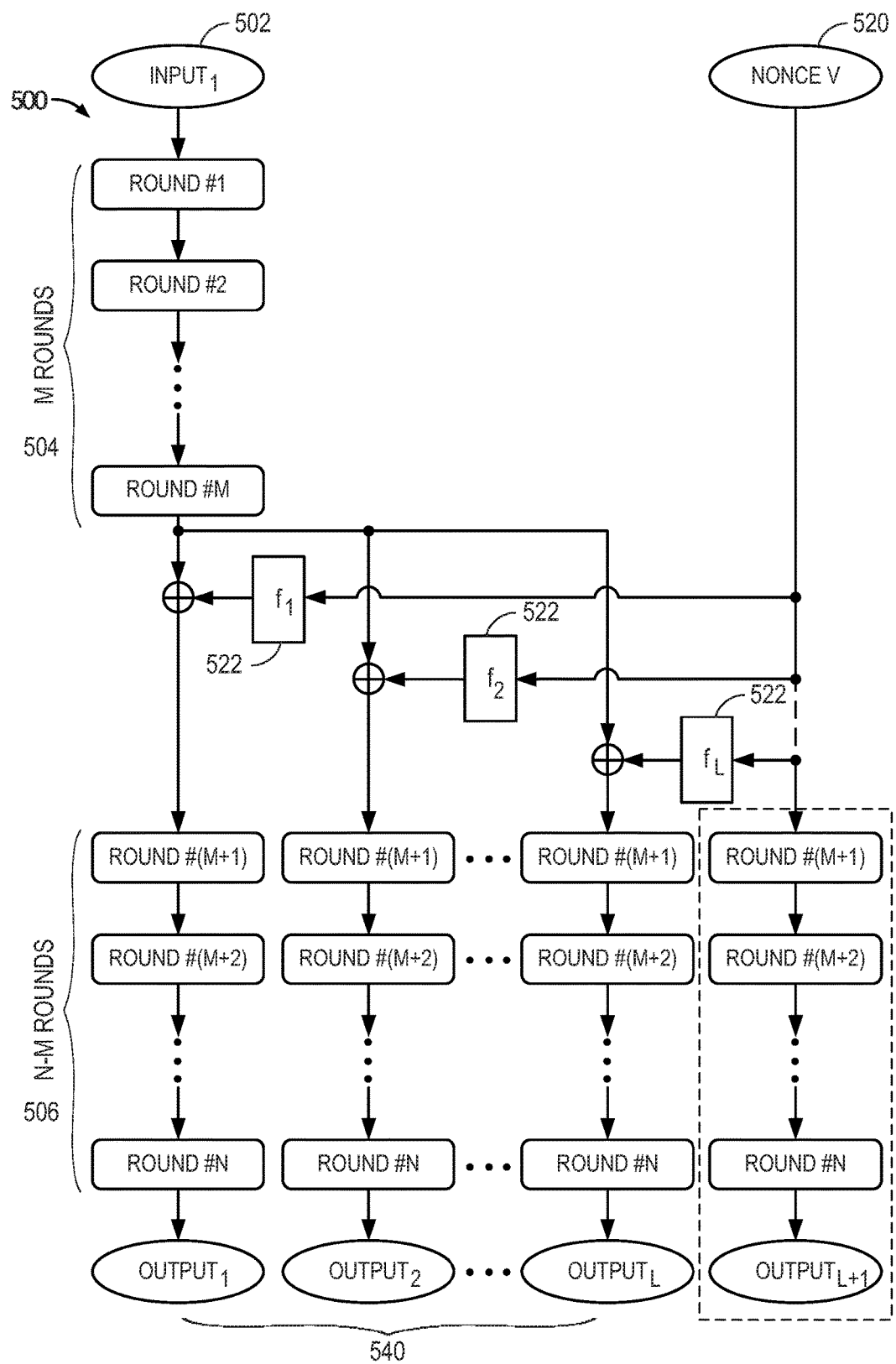
FIG. 5 is a flow diagram illustrating a process to encrypt a data input obtaining several different outputs by applying different values derived from a common Nonce to an intermediate step of the encryption process.

An example of this is displayed with reference to FIG. 5. In this example embodiment process 500, the Input 502 and the Nonce (v) 520 are values used to generate L key stream blocks. The Input 502 is not the plaintext. Similarly, Output1, Output2, . . . OutputL 540 are not the ciphertext, but L blocks of the ciphertext are XORed to these values as in the CTR mode of operation (or are used in a more complex way in some variants of other modes of encryption which only use the encryption primitive of the block cipher). In other aspects, FIG. 5 is similar to FIG. 4A, including a first round (M rounds 504) of round keys before the Nonce 520 is applied, and thereafter, the Nonce 520 is applied, to create Nonced data outputs. Nonce 520 may be applied by functions (f1, f2, . . . , fL) 522 to create Nonced outputs. The function to apply the Nonce 520 may include an XOR function. The Nonced outputs may then be encrypted by a second round (N-M rounds 506) of round keys to create encrypted output 540.

If AES (e.g., AES-128) is chosen as the block cipher, then M=3 or 4 in view of current cryptanalytic results may be used. The rationale being that AES-128 reduced to 6 or 7 rounds is still considerably difficult to attack and then only if the attacker can control the input—which is not possible in this situation. For example, suppose the use case is memory encryption, where whole cache lines are encrypted, these are 128 bytes, so we need 8 blocks (L=8). This means that, for M=3, a total of 3+8*7=59 rounds of AES need to be implemented in HW, in place of 80, leading to an area and power saving of about 26%. For M=4, the number of rounds of AES that are implemented is 4±8*6=52, for a saving of about 35%. The savings may be a bit larger if the key schedule for the last N-M rounds is common to all the pipelines—perhaps with just some fixed bit permutations of the round keys in the parallel pipelines, but probably not more than that—as this should be more than offset by the logic for deriving from the nonce different values to be XORed to the inputs to the (M+1)-th round.

Computation of Nonces

In one embodiment, each time a new block (or set of L blocks) needs to be written to memory, the Nonce may be refreshed. If the block cipher has sufficient diffusion (or it has sufficient diffusion in the last N-M rounds), then it may be sufficient to just shift the Nonce by, for example, s bits, and then append s new fresh random bits to the Nonce. For example, this may be computed for Nonce (v) as v←(v<<s)⊕r, where r is a string of s bits. Further, the fresh bits can be shifted in from the most significant position, or v can be partitioned in various sub-registers that are independently shifted and refreshed. However, if this strategy is used, the Nonces should not be stored in the clear, but encrypted, because storing them in the clear could possibly make future Nonces partially predictable thereby possibly helping cryptanalysis. It should further be noted that the Nonce can either: (a) be a value independent of the physical memory address where the data will be stored; or (b) be dependent from that address. For the latter case, it could be the concatenation of: (i) the physical memory address and (ii) of a random value, a (encrypted) counter, or a value computed by the methods described above or a by a different method.

Example Hardware

Figure 6:
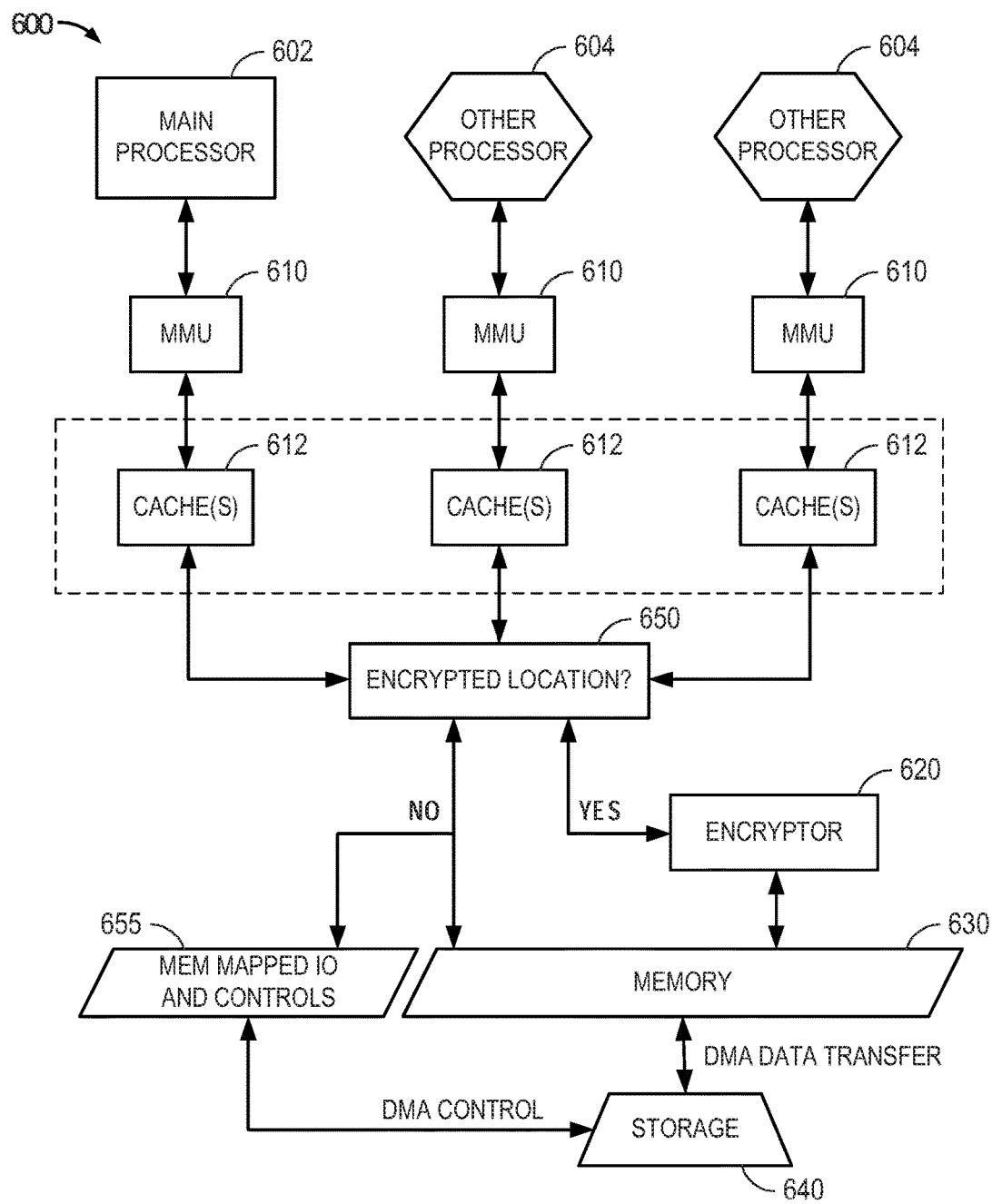
FIG. 6 is a diagram of an example computer hardware system to implement the data encryption techniques for the purpose of enabling the saving and restoring of encrypted memory to mass storage without having to decrypt and re-encrypt it.

Example computer hardware 600 that may implement the previously described methods and processes is illustrated in FIG. 6. The computer system 600 is shown comprising hardware elements that can be electrically coupled via busses (or may otherwise be in communication, as appropriate). The hardware elements may include at least one main processor 602 (e.g., central processing unit (CPU)) as well as other processors 604. It should be appreciated that these processors may be general-purpose processors and/or one or more special-purpose processors (such as digital signal processing chips, graphics acceleration processors, and/or the like). The processors may be coupled to respective memory management units (MMUs) 610, which may in turn be coupled through caches 612 (e.g., caches may or may not be present and/or may be separate or incorporated into other elements) (surrounded by dashed lines), to an encryptor processing unit 620 and/or to memory 630 and/or storage devices 640. As will be described hereinafter, encryptor 620 may utilize the previously described methods and processes to extend the functionality of cipher blocks in order to enhance memory encryption for data to be stored in memory.

It should be appreciated that computer 600 may include other devices (not shown), such as: input devices (e.g., keyboard, mouse, keypad, microphone, camera, etc.); and output devices (e.g., display device, monitor, speaker, printer, etc.). Computer 600 may further include (an/or be in communication with) one or more memory elements, storage devices 630,640, which may comprise local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Computer 600 may also include a communication subsystem, which may include a modem, a network card (wireless or wired), an infrared communication device, a wireless communication device and/or chipset (such as a Bluetooth device, an 802.11 device, a Wi-Fi device, a WiMax device, cellular communication device, etc.), and/or the like. The communications subsystem may permit data to be exchanged with a network, other computer systems, and/or any other devices described herein. It should be appreciated that computer 600 may be a mobile device, non-mobile device, wireless device, wired device, etc., and may have wireless and/or wired connections, and may be any type of electronic or computing device.

In one embodiment, if data is to be stored at an encrypted location (decision block 650), then encryptor 620 (e.g., a device to encrypt data) may implement the previously described process (with additional reference to FIG. 1A) including: receiving a plurality of plaintext data inputs (Input1-InputL) 110; applying a Nonce 122 through functions (f1, f2, . . . , fL) 122 to create Nonced plaintext data outputs that are randomized; and applying an encryption function 130 to the Nonced plaintext data outputs such that encrypted output data (Output1-OutputL) 140 is outputted to memory 630. This data may further be stored in storage 640. In other embodiments, as previously described, to apply an encryption function, encryptor 620 may encrypt the plaintext data inputs utilizing a first sequence of round functions modeling the encryption function before the Nonce is applied. After, this the Nonce is applied, to create the Nonced data outputs. The Nonced data outputs may then be encrypted by a second sequence of round functions modeling the encryption function to create the encrypted output data that is outputted to memory 630. Examples of these implementations are illustrated in FIGS. 2-5, as previously described in detail.

However, if at decision block 650, the data is determined not to be stored at an encrypted location, then the data may be normally stored to memory 630 and/or normal memory mapping input/outs and control 655 may utilized to implement direct memory access (DMA) control to storage 640.

Generally, when memory encryption is available, its contents need be decrypted before they are written to storage device in a virtual memory system. However, to accommodate this, according to embodiments of the invention, a DMA data transfer channel may be used to read the actual, encrypted contents of the memory 630 (e.g., RAM, DDR RAM, etc.) and can be used to write them to a sector of the storage device 640 (e.g., a hard drive or a flash memory), as well as, to read from a sector and place the contents directly into memory 630. Thus, these memory encryption methods may be independent of the physical addresses and pages can be swapped out and back in without additional encryption/decryption overhead.

A benefit of the previously described system is that memory contents do not need to be decrypted and re-encrypted each time they are moved to the swap file and back to memory, which results in significant power savings and in time savings. Further, the techniques described herein, not only offer good direct protection against physical or electrical memory attacks—i.e. against direct reading of the memory—but also offer resistance against attacks that use the bus traffic as a side channel, as repeated writes of the same or correlated data to the same location are effectively randomized. Furthermore, the techniques described herein require a relatively small additional hardware implementation. Also, the techniques described herein are generic enough such that they can be applied to essentially any commonly-used block cipher. Additionally, the input and output sizes of each round do not all have to be equal and masking operations have to be adapted only minimally in these cases. Moreover, the direct DMA channel for saving encrypted memory can also bring significant savings in power consumption and time.

Further, as previously described, the Nonce may be stored in the main memory 630, either in a clear unencrypted manner or in an encrypted manner, depending on the implementation. Alternatively, as previously described, the Nonce may be stored in a small, protected area of a specialized memory.

Also, it should be appreciated that, in one example, if a fixed key is chosen randomly at device boot, the corresponding key schedule may be pre-computed at the time. As a particular example, there could be a master key, or a dependency on memory address, if required, that could be placed in the key. As a further example, the Nonce could be: a fixed value (in which case all derived constants, such as: the outputs of functions (f1, f2, . . . , fL) can be pre-computed), a per page value, or could be dependent on the physical memory address. These example schemes may be used for simplification purposes.

It should be appreciated that techniques to provide an enhanced mechanism for the protection of data stored in memory by extending the functionality of block ciphers, as previously described, may be implemented as software, firmware, hardware, combinations, thereof, etc. In one embodiment, the previous described functions may be implemented by one or more processors (e.g., encryptor 620 or other processors) of a computer 600 to achieve the previously desired functions (e.g., the method operations of FIGS. 1-5). Moreover, as previously described with reference to FIGS. 1-5, decryption simply works backwards.

It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a computer, a wired computer, a wireless computer, a phone (e.g., a cellular phone), a personal data assistant ("PDA"), a tablet, a mobile computer, a mobile device, a non-mobile device, a wired device, a wireless device, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a fixed computer, a desktop computer, a server, a point-of-sale (POS) device, an entertainment device, a set-top box, an ATM, or any other suitable electronic/computing device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to encrypt plaintext data comprising:
   receiving at least one plaintext data input;
   applying an encryption function to encrypt the at least one plaintext data input by a first sequence of round functions modeling the encryption function before a Nonce is applied, a plurality of round functions of the first sequence of round functions each applying one of a plurality of round keys derived from a cipher key, and thereafter, applying the Nonce through a function to create Nonced data outputs, the creating of the Nonced data outputs comprising an XOR operation, and the Nonced data outputs are encrypted by a second sequence of round functions modeling the encryption function to create encrypted output data, a plurality of round functions of the second sequence of round functions each applying one of the plurality of round keys derived from the cipher key;
   transmitting the encrypted output data to memory; and
   transmitting the encrypted output data from the memory to a swap file on a storage device and then back to the memory without decryption or further encryption.

2. The method of claim 1, wherein the Nonce is stored in an encrypted manner.

3. The method of claim 1, wherein the Nonce is stored in an unencrypted manner.

4. The method of claim 1, wherein the function is a mathematical function that derives values from the Nonce to perturbate the Nonced data outputs in an unpredictable manner.

5. The method of claim 4, wherein the function includes binary or arithmetic addition constants, circular rotations or arbitrary permutations of the bits representing the input to said function.

6. The method of claim 1, further comprising decrypting the encrypted output data from memory.

7. A non-transitory computer-readable medium including code that, when executed by a processor, causes the processor to:
   receive at least one plaintext data input;
   apply an encryption function to encrypt the at least one plaintext data input by a first sequence of round functions modeling the encryption function before a Nonce is applied, a plurality of round functions of the first sequence of round functions each applying one of a plurality of round keys derived from a cipher key, and thereafter, applying the Nonce through a function to create Nonced data outputs, the creating of the Nonced data outputs comprising an XOR operation, and the Nonced data outputs are encrypted by a second sequence of round functions modeling the encryption function to create encrypted output data, a plurality of round functions of the second sequence of round functions each applying one of the plurality of round keys derived from the cipher key;

transmit the encrypted output data to memory; and transmit the encrypted output data from the memory to a swap file on a storage device and then back to the memory without decryption or further encryption.

8. The computer-readable medium of claim 7, wherein the Nonce is stored in an encrypted manner.

9. The computer-readable medium of claim 7, wherein the Nonce is stored in an unencrypted manner.

10. The computer-readable medium of claim 7, wherein the function is a mathematical function that derives values from the Nonce to perturbate the Nonced data outputs in an unpredictable manner.

11. The computer-readable medium of claim 10, wherein the function includes binary or arithmetic addition constants, circular rotations or arbitrary permutations of the bits representing the input to said function.

12. The computer-readable medium of claim 7, further comprising code to decrypt the encrypted output data from memory.

13. A device to encrypt plaintext data comprising:
a processor to:
receive at least one plaintext data input;
apply an encryption function to encrypt the at least one plaintext data input by a first sequence of round functions modeling the encryption function before a Nonce is applied, a plurality of round functions of the first sequence of round functions each applying one of a plurality of round keys derived from a cipher key, and thereafter, apply the Nonce through a function to create Nonced data outputs, the creating of the Nonced data outputs comprising an XOR operation, and the Nonced data outputs are encrypted by a second sequence of round functions modeling the encryption function to create encrypted output data, a plurality of round functions of the second sequence of round functions each applying one of the plurality of round keys derived from the cipher key;

transmit the encrypted output data to memory; and transmit the encrypted output data from the memory to a swap file on a storage device and then back to the memory without decryption or further encryption.

14. The device of claim 13, wherein the Nonce is stored in an encrypted manner.

15. The device of claim 13, wherein the Nonce is stored in an unencrypted manner.

16. The device of claim 13, wherein the function is mathematical function that derives values from the Nonce to perturbate the Nonced data outputs in an unpredictable manner.

17. The device of claim 16, wherein the function includes binary or arithmetic addition constants, circular rotations or arbitrary permutations of the bits representing the input to said function.

18. The device of claim 13, wherein the processor further decrypts the encrypted output data from memory.

19. A device to encrypt plaintext data comprising:
means for receiving at least one plaintext data input;
means for applying an encryption function to encrypt the at least one plaintext data input by a first sequence of round functions modeling the encryption function before a Nonce is applied, a plurality of round functions of the first sequence of round functions each applying one of a plurality of round keys derived from a cipher key, and thereafter, applying the Nonce through a function to create Nonced data outputs, the creating of the Nonced data outputs comprising an XOR operation, and the Nonced data outputs are encrypted by a second sequence of round functions modeling the encryption function to create encrypted output data, a plurality of round functions of the second sequence of round functions each applying one of the plurality of round keys derived from the cipher key;

means for transmitting the encrypted output data to memory; and means for transmitting the encrypted output data from the memory to a swap file on a storage device and then back to the memory without decryption or further encryption.

20. The device of claim 19, wherein the Nonce is stored in an encrypted manner.

21. The device of claim 19, wherein the Nonce is stored in an unencrypted manner.

22. The device of claim 19, wherein the function is a mathematical function that derives values from the Nonce to perturbate the Nonced data outputs in an unpredictable manner.

23. The device of claim 22, wherein the function includes binary or arithmetic addition constants, circular rotations or arbitrary permutations of the bits representing the input to said function.

24. The device of claim 19, further comprising means for decrypting the encrypted output data from memory.

* * * * *